United States Patent [19]

Hagedon et al.

[11] 4,366,483

[45] Dec. 28, 1982

[54] RECEIVER AND METHOD FOR USE WITH A FOUR-ARM SPIRAL ANTENNA

[75] Inventors: Gary L. Hagedon, Alta Loma; John T. Brustad, Claremont, both of Calif.

[73] Assignee: General Dynamics, Pomona Division, Pomona, Calif.

[21] Appl. No.: 203,215

[22] Filed: Nov. 3, 1980

[51] Int. Cl.³ .......................... G01S 3/32; H01Q 1/36
[52] U.S. Cl. ........................ 343/113 R; 343/16 M; 343/119; 343/895
[58] Field of Search ................ 343/16 M, 113 R, 119

[56] References Cited

U.S. PATENT DOCUMENTS

| | | | |
|---|---|---|---|
| 3,013,265 | 12/1961 | Wheeler | 343/113 R |
| 3,175,217 | 3/1965 | Kaiser, Jr. et al. | 343/113 R |
| 3,229,293 | 1/1966 | Little et al. | 343/113 R |
| 3,246,331 | 4/1966 | Royal | 343/113 R |
| 3,344,425 | 9/1967 | Webb | 343/16 M |
| 3,381,297 | 4/1968 | Zisler et al. | 343/113 R |
| 3,566,407 | 2/1971 | Trippe | 343/16 M |
| 3,683,385 | 8/1972 | Corzine et al. | 343/113 R |

Primary Examiner—T. H. Tubbesing
Attorney, Agent, or Firm—Neil F. Martin; Edward W. Callan; Edward B. Johnson

[57] ABSTRACT

A receiver for locating a source of RF radiation received by a four-arm spiral antenna having an angular measurement frame normal to the antenna axis, including a detection circuit for detecting signals received from each of the spiral arms in response to receipt of RF radiation by the antenna; a first comparison circuit for comparing signals detected from a first opposite pair of the spiral arms to produce a first signal that is proportional to a first function of the frequency of the received RF radiation and the angular displacement of the radiation source in the measurement frame; a second comparison circuit for comparing signals detected from the remaining opposite pair of the spiral arms to produce a second signal that is proportional to a second function of the frequency of the received RF radiation and the angular displacement of the radiation source in the measurement frame; and a processing circuit for processing the first and second signals to produce third and fourth signals that are proportional to the angular displacement and independent of the frequency of the received RF radiation.

4 Claims, 10 Drawing Figures

RECEIVER AND METHOD FOR USE WITH A FOUR-ARM SPIRAL ANTENNA

BACKGROUND OF THE INVENTION

The present invention generally pertains to electronic communications, and is particularly directed to an improved receiver and method for locating a source of RF radiation received by a four-arm spiral antenna.

Figure 1:
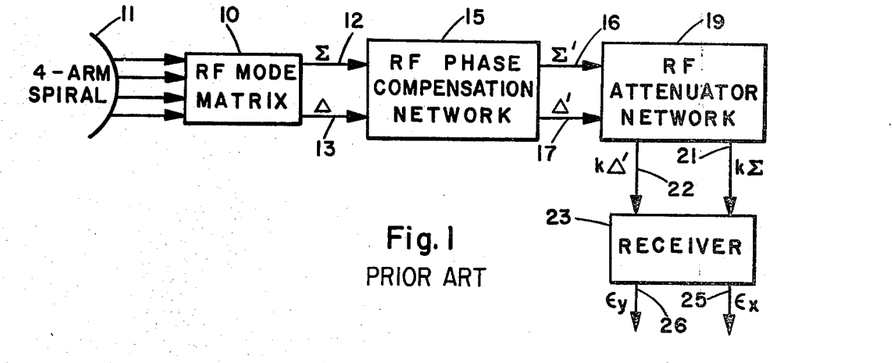
FIG. 1 is a block diagram showing a prior art receiver system for use with a four-arm spiral antenna.

A prior art receiver system for locating a source of RF radiation received by a four-arm spiral antenna is shown in FIG. 1. The system includes an RF mode matrix 10 coupled to the four-spiral arms of the antenna 11 for providing a first mode signal $\Sigma$ on line 12 and a second mode signal $\Delta$ on line 13. The first and second mode signals respectively represent sum and difference antenna patterns. The difference between the first and second mode signals is a function of the frequency of the received RF radiation. Therefore, an RF phase rotation compensation network 15 is provided to process the first and second mode signals to provide phase corrected first and second mode signals $\Sigma'$ and $\Delta'$ on lines 16 and 17 respectively. An attenuation network 19 may be provided to attenuate the phase corrected first and second mode signals on lines 16 and 17, depending upon system requirements. It may be necessary to attenuate the $\Sigma'$ and $\Delta'$ signals to minimize boresight errors. Attenuated phase corrected first and second mode signals $k\Sigma'$ and $k\Delta'$ are provided on lines 21 and 22 respectively to a receiver 23. The $k\Sigma'$ and $k\Delta'$ signals are processed by the receiver 23 to provide output signals $\epsilon_x$ and $\epsilon_y$ on lines 25 and 26. The $\epsilon_x$ and $\epsilon_y$ signals are a function of the angular displacement of the radiation source in an angular measurement frame that is normal to the antenna axis; and are useful for locating the RF radiation source, such as by tracking, guidance and/or direction finding.

The RF mode matrix 10 and the RF phase compensation network 15 substantially add to the cost, packaging size and complexity of the monopulse receiver system.

SUMMARY AND THEORY OF THE INVENTION

The present invention eliminates the need for an RF mode matrix and an RF phase compensation network by providing an improved receiver and method, and thereby reduces the cost, packaging size and complexity of the receiver system.

Figure 2:
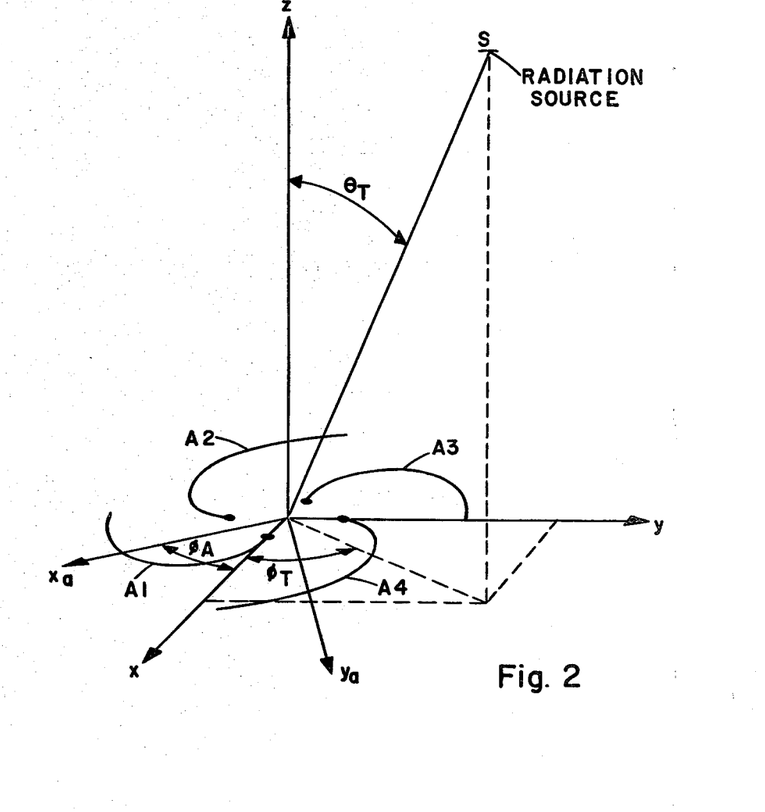
FIG. 2 illustrates the geometrical relationships between a radiation source and a four-arm spiral antenna.

The theory of the present invention is discussed with reference to FIG. 2, which illustrates the geometrical relationships between the four-arm spiral antenna and the radiation source S. The four spiral arms of the antenna A1, A2, A3 and A4 are arrayed about the antenna axis z. The x and y coordinates define an angular measurement frame normal to the antenna axis z. The angle $\theta_T$ is the angular displacement of the radiation source with respect to the antenna axis z. The $x_A$ and $y_A$ coordinates define a measurement system in the angular measurement frame that is dependent upon the frequency of the RF radiation received by the antenna. The angle $\phi_A$ from the $x_A$ axis to the x axis is a function of the frequency of the RF radiation received by the antenna. The angle $\phi_T$ is the angle of displacement of the radiation source in the angular measurement frame.

The signals on each of the arms of the four-arm spiral antenna can be related to the amplitude patterns associated with the antenna modes and the phasing between the modes as follows:

$$\text{Signal on Arm } k = \sum_{i=1}^{\infty} |\text{Mode } i| \, e^{j[i(\phi_T + \phi_A) \pm (K-1)\pi/2 + \omega_{RF}t]} \quad (1)$$

The $\pm$ sign in the exponent is determined by the construction of the antenna. The frequency dependent angle $\phi_A$ is further determined by the construction of the antenna. The term $\omega_{RF}$ is the radiant frequency of the received RF radiation. The signal magnitude in a given mode, Mode 1, and the displacement angle $\phi_T$ are determined by the location of the radiation source S. Expression (1) has been normalized by the signal amplitude that would be received were the source S on antenna boresight. Ignoring for the moment modes higher than mode 2, the signals on the four-spiral arms can be written as:

$$\text{Signal on Arm } 1 = (\Sigma + j\Delta e^{j[\phi_T + \phi_A]}) e^{j\omega_{RF}t} \quad (2)$$

$$\text{Signal on Arm } 2 = (j\Sigma - j\Delta e^{j[\phi_T + \phi_A]}) e^{j\omega_{RF}t} \quad (3)$$

$$\text{Signal on Arm } 3 = (-\Sigma + j\Delta e^{j[\phi_T + \phi_A]}) e^{j\omega_{RF}t} \quad (4)$$

$$\text{Signal on Arm } 4 = (-j\Sigma - j\Delta e^{j[\phi_T + \phi_A]}) e^{j\omega_{RF}t} \quad (5)$$

"$\Sigma$" refers to $|\text{Mode } 1|$ and "$\Delta$" refers to $|\text{Mode } 2|$.

Signals proportional to the location of the radiation source S can be obtained through either phase or log amplitude comparison of the signals on antenna arms 1 and 3 and arms 2 and 4.

Log Comparison:

$$\text{Log}_e \frac{|3|}{|1|} = \tfrac{1}{2} \text{Log}_e \left[ \frac{\Sigma^2 + \Delta^2 + 2\Delta\Sigma\sin(\phi_T + \phi_A)}{\Sigma^2 + \Delta^2 - 2\Delta\Sigma\sin(\phi_T + \phi_A)} \right] \quad (6)$$

$$\text{Log}_e \frac{|4|}{|2|} = \tfrac{1}{2} \text{Log}_e \left[ \frac{\Sigma^2 + \Delta^2 + 2\Delta\Sigma\cos(\phi_T + \phi_A)}{\Sigma^2 + \Delta^2 - 2\Delta\Sigma\cos(\phi_T + \phi_A)} \right] \quad (7)$$

Phase Comparison:

$$\phi_{1-3} = \tan^{-1}\left[ \frac{\Delta\cos(\phi_T + \phi_A)}{\Sigma - \Delta\sin(\phi_T + \phi_A)} \right] - \tan^{-1}\left[ \frac{\Delta\cos(\phi_T + \phi_A)}{-\Sigma - \Delta\sin(\phi_T + \phi_A)} \right] \quad (8)$$

$$\phi_{4-2} = \tan^{-1}\left[ \frac{\Delta\sin(\phi_T + \phi_A)}{\Sigma - \Delta\cos(\phi_T + \phi_A)} \right] - \tan^{-1}\left[ \frac{\Delta\sin(\phi_T + \phi_A)}{-\Sigma - \Delta\cos(\phi_T + \phi_A)} \right] \quad (9)$$

When $\Delta < < \Sigma$, expressions (6) through (9) may be simplified to:

Log Comparison:

$$\text{Log}_e \frac{|3|}{|1|} \simeq 2 \frac{\Delta}{\Sigma} \sin(\phi_T + \phi_A) = \epsilon_A \quad (10)$$

$$\text{Log}_e \frac{|4|}{|2|} \simeq 2 \frac{\Delta}{\Sigma} \cos(\phi_T + \phi_A) = \epsilon_B \quad (11)$$

Phase Comparison:

$$\phi_{1-3} + 180° \cong 2 \frac{\Delta}{\Sigma} \cos(\phi_T + \phi_A) = \epsilon_B \quad (12)$$

$$\phi_{4-2} + 180° \cong 2 \frac{\Delta}{\Sigma} \sin(\phi_T + \phi_A) = \epsilon_A \quad (13)$$

In order to use $\epsilon_A$ and $\epsilon_B$ for tracking, guidance and/or direction finding, it is necessary to process the signals $\epsilon_A$ and $\epsilon_B$ to remove the term $\phi_A$. In the prior art system, the frequency dependent signal components were in effect removed by the RF phase rotation compensation network 15. However, in a system without a mode matrix, it is not possible to remove the frequency dependent signal component $\phi_A$ with an RF phase compensation network. The receiver and method of the present invention process the comparison signals $\epsilon_A$ and $\epsilon_B$ to remove the frequency dependent component $\phi_A$.

The receiver of the present invention includes a detection circuit for detecting signals received from each of the spiral arms in response to receipt of RF radiation by the antenna; a first comparison circuit for comparing signals detected from a first opposite pair of the spiral arms to produce a first signal such as the signal $\epsilon_A$, that is proportional to a first function of the frequency of the received RF radiation and the angular displacement of the radiation source in the measurement frame; a second comparison circuit for comparing signals detected from the remaining opposite pair of the spiral arms to produce a second signal such as the signal $\epsilon_B$ that is proportional to a second function of the frequency of the received RF radiation and the angular displacement of the radiation source in the measurement frame; and a processing circuit for processing the first and second signals to produce third and fourth signals $\epsilon_x$ and $\epsilon_y$ that are proportional to the angular displacement and independent of the frequency of the received RF radiation. The signal comparison may be either a log amplitude comparison or a phase comparison.

In the preferred embodiments, the processing circuit includes two summing devices and four multipliers that process the $\epsilon_A$ and $\epsilon_B$ signals to remove $\phi_A$ in accordance with the transformation:

$$\begin{bmatrix} 2\frac{\Delta}{\Sigma}\sin\phi_T \\ 2\frac{\Delta}{\Sigma}\cos\phi_T \end{bmatrix} = \begin{bmatrix} \cos\phi_A & -\sin\phi_A \\ \sin\phi_A & \cos\phi_A \end{bmatrix} \begin{bmatrix} 2\frac{\Delta}{\Sigma}\sin(\phi_T+\phi_A) \\ 2\frac{\Delta}{\Sigma}\cos(\phi_T+\phi_A) \end{bmatrix} \quad (14)$$

to provide output signals $\epsilon_x$ and $\epsilon_y$ that are respectively proportional to $\cos\phi_T$ and $\sin\phi_T$.

DESCRIPTION OF THE PREFERRED EMBODIMENTS

Figure 3:
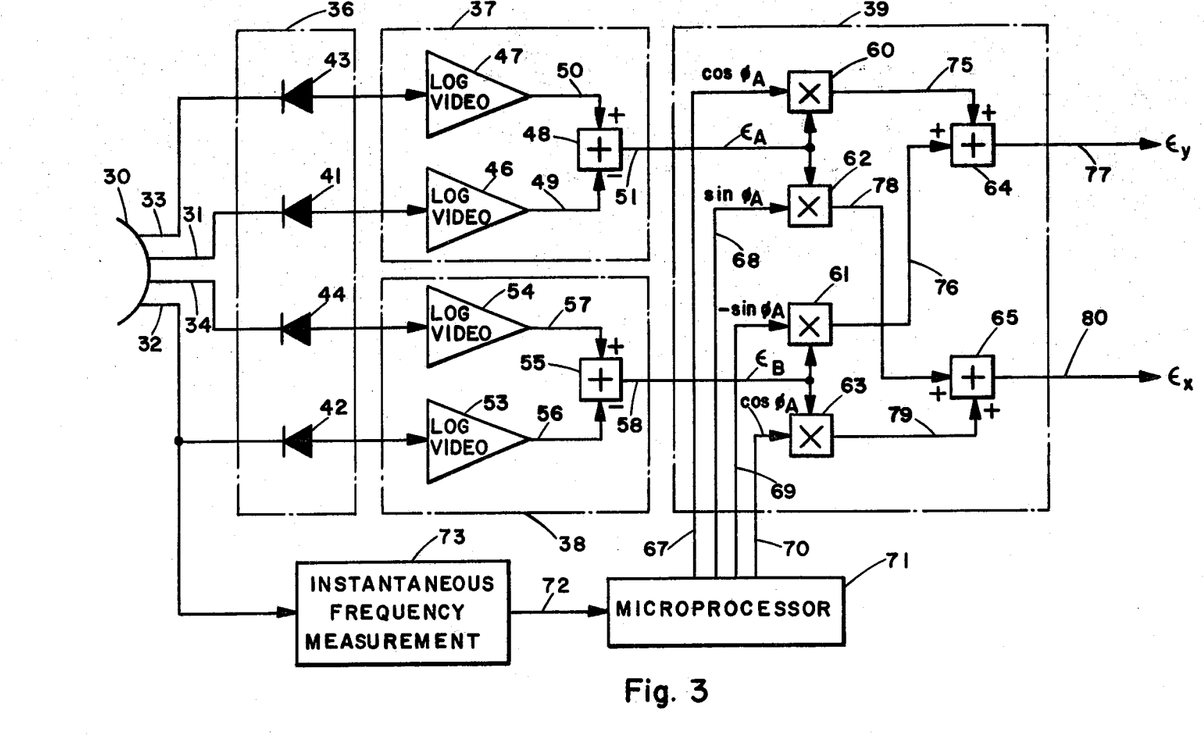
FIG. 3 is a schematic diagram of a preferred embodiment of a receiver according to the present invention employing a log amplitude comparison of the detected signals.

A monopulse crystal receiver according to the present invention is shown in FIG. 3. The receiver is coupled to a four-arm spiral antenna 30. The antenna has a first lead 31 from antenna arm A1 (as shown in FIG. 2), a second lead 32 from arm A2, a third lead 33 from A3 and a fourth lead 34 from arm A4.

The receiver includes a detection circuit 36, a first comparison circuit 37, a second comparison circuit 38 and a processing circuit 39.

The detection circuit 36 includes crystal detectors 41, 42, 43 and 44, which are respectively coupled to the antenna arms by leads 31, 32, 33 and 34 for detecting the signals received from each of the spiral arms in response to receipt of RF radiation by the antenna 30.

The first comparison circuit 37 includes log video amplifiers 46 and 47 and a summing device 48. The log video amplifier 46 is coupled to the first arm of the antenna via the detector 41 and provides a signal on line 49 that is representative of the logarithm of the amplitude of the detected signal from the detector 41. The log video amplifier 47 is coupled to the third arm of the antenna via the detector 43 and provides a signal on line 50 that is representative of the logarithm of the amplitude of the detected signal from the detector 43. The summing device 48 adds the signal on line 50 to the negative of the signal on line 49 to effect a log amplitude comparison of the signals on lines 50 and 49 and thereby provides an $\epsilon_A$ signal on line 51 in accordance with expression (10) above.

The second comparison circuit 38 includes log video amplifiers 53 and 54 and a summing device 55. The log video amplifier 53 is coupled to the second arm of the antenna via the detector 42 and provides a signal on line 56 that is representative of the logarithm of the amplitude of the detected signal from the detector 42. The log video amplifier 54 is coupled to the fourth arm of the antenna via the detector 44 and provides a signal on line 57 that is representative of the logarithm of the amplitude of the detected signal from the detector 44. The summing device 55 adds the signal on line 57 to the negative of the signal on line 56 to effect a log amplitude comparison of the signals on lines 57 and 56 and thereby provides an $\epsilon_B$ signal on line 58 in accordance with expression (11) above.

The processing circuit 39 includes four multipliers 60, 61, 62 and 63 and two summing devices 64 and 65 for processing the $\epsilon_A$ and $\epsilon_B$ signals on lines 51 and 58 respectively. The processing circuit 39 also receives $\phi_A$ angle function signals on lines 67, 68, 69 and 70 from a microprocessor 71. The microprocessor 71 provides a signal representative of cos $\phi_A$ on line 67, a signal representative of sin $\phi_A$ on line 68, a signal representative of $-\sin \phi_A$ on line 69, and a signal representative on cos $\phi_A$ on line 70. These signals on lines 67, 68, 69 and 70 are generated by the microprocessor 71 in response to a frequency signal on line 72 that indicates the frequency of the radiation received by the antenna 30 from the RF radiation source of interest. The frequency signal is provided on line 72 by an instantaneous frequency measurement device 73, which is coupled to the second arm of the antenna 30, via the lead 32.

The multiplier 60 multiplies the $\epsilon_A$ signal on line 51 by the cos $\phi_A$ signal on line 67 to provide a signal on line 75 that is representative of $\epsilon_A \cos \phi_A$.

The multiplier 61 multiplies the $\epsilon_B$ signal on line 58 by the $-\sin \phi_A$ signal on line 69 to provide a signal on line 76 that is representative of $-\epsilon_B \sin \phi_A$.

The summing device 64 adds the signal on line 57 to the signal on line 76 to provide an $\epsilon_y$ signal on line 77 that is proportional to sin $\phi_T$.

The multiplier 62 multiplies the $\epsilon_A$ signal on line 51 by the sin $\phi_A$ signal on line 68 to provide a signal on line 78 that is representative of $\epsilon_A$ and $\phi_A$.

The multiplier 63 multiplies the $\epsilon_B$ signal on line 58 by the cos $\phi_A$ signal on line 70 to provide a signal on line 79 that is representative of $\epsilon_B \cos \phi_A$.

The summing device 65 adds the signal on line 78 to the signal on line 79 to provide an $\epsilon_x$ signal on line 80 that is proportional to cos $\phi_T$.

Figure 4:
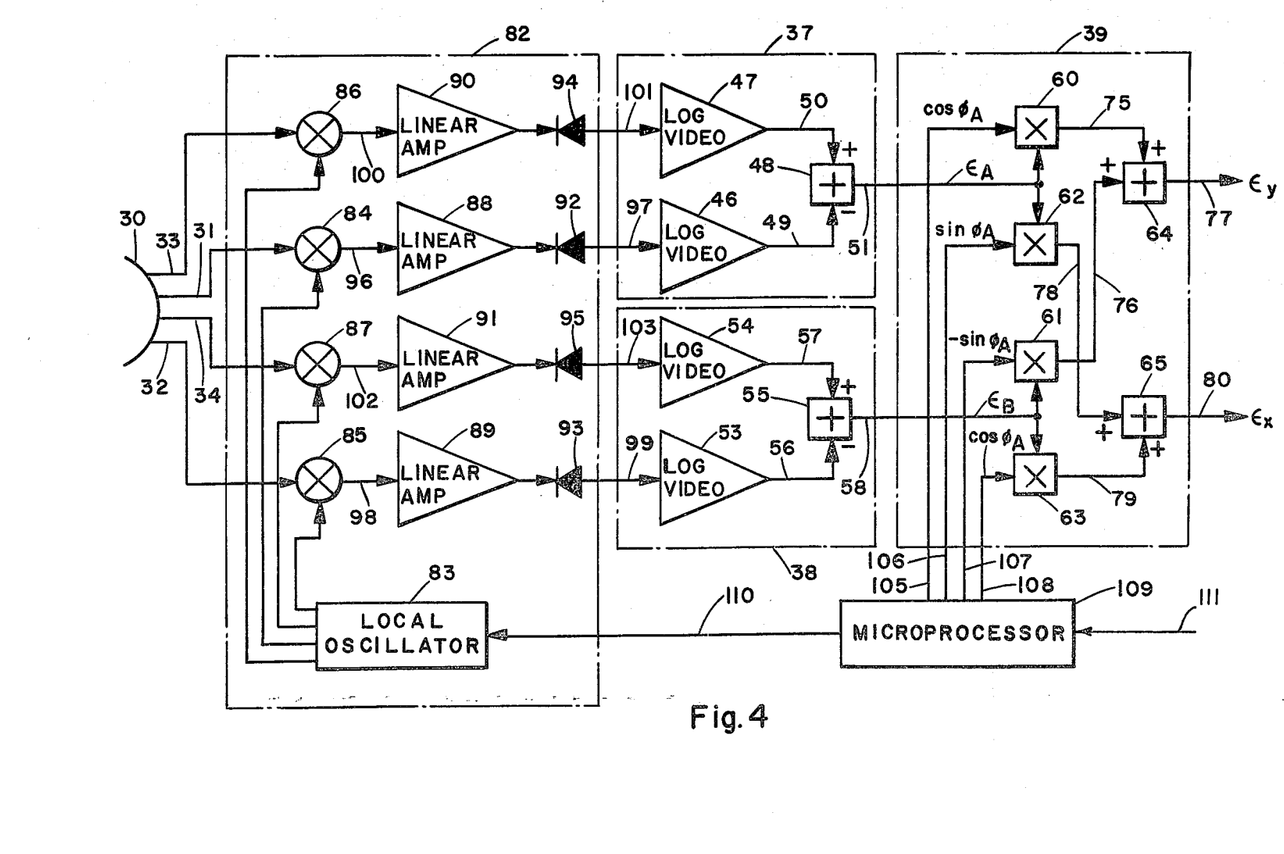
FIG. 4 is a schematic diagram of another preferred embodiment of a receiver according to the present invention employing a log amplitude comparison of the detected signals.

A monopulse superheterodyne log video receiver according to the present invention is shown in FIG. 4. Certain of the components of this receiver are the same as some of the components of the receiver of FIG. 3 and they are referred to by common reference numerals.

The receiver of FIG. 4 is coupled to a four-arm spiral antenna 30. The antenna has a first lead 31 from antenna arm A1 (as shown in FIG. 2), a second lead 32 from arm A2, a third lead 33 from arm A3 and a fourth lead 34 from arm A4.

The receiver includes a detection circuit 82, a first comparison circuit 37, a second comparison circuit 38 and a processing circuit 39.

The detection circuit 82 includes a local oscillator 83; four mixers 84, 85, 86 and 87, four linear amplifiers 88, 89, 90 and 91 and four detector diodes 92, 93, 94 and 95. The local oscillator 83 provides a high frequency signal to the mixers.

The mixer 84 mixes the signal received on lead 31 from the first arm of the antenna 30 with the high frequency signal from the local oscillator network 83 to provide a first intermediate frequency (IF) signal on line 96. The IF signal on line 96 is amplified by the linear amplifier 88 and fed to the diode detector 92 to provide a first detected signal on line 97.

The mixer 85 mixes the signal received on lead 32 from the second arm of the antenna 30 with the high frequency signal from the local oscillator 83 to provide a second IF signal on line 98. The IF signal on line 98 is amplified by the linear amplifier 89 and fed to the diode detector 93 to provide a second detected signal on line 99.

The mixer 86 mixes the signal received on lead 33 from the third arm of the antenna 30 with the high frequency signal from the local oscillator 83 to provide a third IF signal on line 100. The IF signal on line 100 is amplified by the linear amplifier 90 and fed to the diode detector 94 to provide a third detected signal on line 101.

The mixer 87 mixes the signal received on lead 34 from the fourth arm of the antenna 30 with the high frequency signal from the local oscillator 83 to provide a fourth IF signal on line 102. The IF signal on line 102 is amplified by the linear amplifier 91 and fed to the diode detector 95 to provide a fourth detected signal on line 103.

The first comparison circuit 37 includes log video amplifiers 46 and 47 and a summing device 48. The log video amplifier 46 is coupled to the first arm of the antenna via the line 97 and provides a signal on line 49 that is representative of the logarithm of the amplitude of the detected signal from the diode detector 92. The log video amplifier 47 is coupled to the third arm of the antenna via the line 101 and provides a signal on line 50 that is representative of the logarithm of the amplitude of the detected signal from the diode detector 94. The summing device 48 adds the signal on line 50 to the negative of the signal on line 49 to effect a log amplitude comparison of the signals on lines 50 and 49 and thereby provides an $\epsilon_A$ signal on line 41 in accordance with expression (10) above.

The second comparison circuit 38 includes log video amplifiers 53 and 54 and a summing device 55. The log video amplifier 53 is coupled to the second arm of the antenna via the line 99 and provides a signal on line 56 that is representative of the logarithm of the amplitude of the detected signal from the diode detector 93. The log video amplifier 54 is coupled to the fourth arm of the antenna via the line 103 and provides a signal on line 57 that is representative of the logarithm of the amplitude of the detected signal from the diode detector 95. The summing device 55 adds the signal on line 57 to the negative of the signal on line 56 to effect a log amplitude comparison of the signals on lines 57 and 56 and thereby provides an $\epsilon_B$ signal on line 58 in accordance with expression (11) above.

The processing circuit 39 includes four multipliers 60, 61, 62 and 63 and two summing devices 64 and 65 for processing the $\epsilon_A$ and $\epsilon_B$ signals on lines 51 and 58 respectively. The processing circuit 39 also receives $\phi_A$ angle function signals on lines 105, 106, 107 and 108 from a microprocessor 109. The microprocessor 109 provides a signal representative of cos $\phi_A$ on line 105, a signal representative of sin $\phi_A$ on line 106, a signal representative of $-\sin \phi_A$ on line 107, and a signal representative on cos $\phi_A$ on line 108. The microprocessor 109 generates the signals on lines 105, 106, 107 and 108 in accordance with the frequency of the radiation received from the RF source being tracked by the monopulse receiver. Determination of the frequency of such received radiation for use by the microprocessor is accomplished with a control circuit (not shown), which is known to those skilled in the art, and which does not form a part of the present invention. A signal indicating the frequency of the received radiation is provided by the control circuit to the microprocessor 109 via line 111.

The microprocessor also provides a signal on line 110 for controlling the frequency of the local oscillator 83.

The multiplier 60 multiplies the $\epsilon_A$ signal on line 51 by the cos $\phi_A$ signal on line 105 to provide a signal on line 75 that is representative of $\epsilon_A \cos \phi_A$.

The multiplier 61 multiples the $\epsilon_B$ signal on line 58 by the $-\sin \phi_A$ signal on line 107 to provide a signal on line 76 that is representative of $-\epsilon_B \sin \phi_A$.

The summing device 64 adds the signal on line 75 to the signal on line 76 to provide an $\epsilon_y$ signal on line 77 that is proportional to $\sin \phi_T$.

The multiplier 62 multiplies the $\epsilon_A$ signal on line 51 by the $\sin \phi_A$ signal on line 106 to provide a signal on line 78 that is representative of $\epsilon_A \sin \phi_A$.

The multiplier 63 multiplies the $\epsilon_B$ signal on line 58 by the $\cos \phi_A$ signal on line 108 to provide a signal on line 79 that is representative of $\epsilon_B \cos \phi_A$.

The summing device 65 adds the signal on line 78 to the signal on line 79 to provide an $\epsilon_x$ signal on line 80 that is proportional to $\cos \phi_T$.

Figure 5:
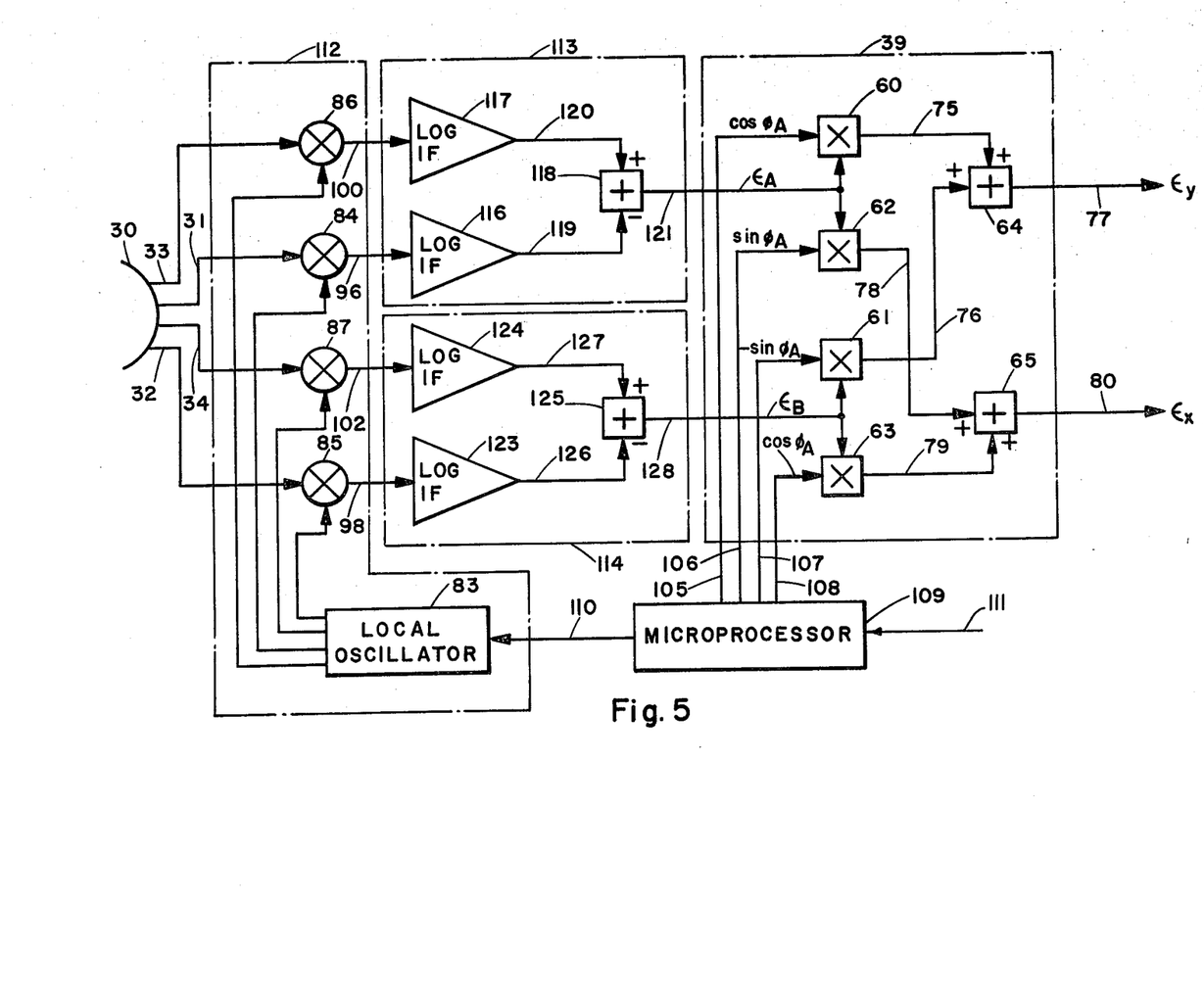
FIG. 5 is a schematic diagram of an additional preferred embodiment of a receiver according to the present invention employing a log amplitude comparison of the detected signals.

A monopulse superheterodyne log IF receiver according to the present invention is shown in FIG. 5. Certain of the components of this receiver are the same as some of the components of the receivers of FIGS. 3 and 4 and they are referred to by common reference numerals.

The receiver of FIG. 5 is coupled to a four-arm spiral antenna 30. The antenna has a first lead 31 from antenna arm A1 (as shown in FIG. 2), a second lead 32 from arm A2, a third lead 33 from arm A3 and a fourth lead 34 from arm A4.

The receiver includes a detection circuit 112, a first comparison circuit 113, a second comparison circuit 114 and a processing circuit 39.

The detection circuit 112 includes a local oscillator 83 and four mixers 84, 85, 86 and 87. The local oscillator 83 provides a high frequency signal to the mixers.

The mixer 84 mixes the signal received on lead 31 from the first arm of the antenna 30 with the high frequency signal from the local oscillator network 83 to provide a first intermediate frequency (IF) signal on line 96.

The mixer 85 mixes the signal received on lead 32 from the second arm of the antenna 30 with the high frequency signal from the local oscillator 83 to provide a second IF signal on line 98.

The mixer 86 mixes the signal received on lead 33 from the third arm of the antenna 30 with the high frequency signal from the local oscillator 83 to provide a third IF signal on line 100.

The mixer 87 mixes the signal received on lead 34 from the fourth arm of the antenna 30 with the high frequency signal from the local oscillator 83 to provide a fourth IF signal on line 102.

The first comparison circuit 113 includes log IF amplifiers 116 and 117 and a summing device 118. The log IF amplifier 116 is coupled to the first arm of the antenna via the mixer 84 and provides a signal on line 119 that is representative of the logarithm of the amplitude of the IF signal on line 96. The log IF amplifier 117 is coupled to the third arm of the antenna via the mixer 86 and provides a signal on line 120 that is representative of the logarithm of the amplitude of the IF signal on line 100. The summing device 118 adds the signal on line 120 to the negative of the signal on line 119 to effect a log amplitude comparison of the signals on lines 120 and 119 and thereby provides an $\epsilon_A$ signal on line 121 in accordance with expression (10) above.

The second comparison circuit 114 includes log IF amplifiers 123 and 124 and a summing device 125. The log IF amplifier 123 is coupled to the second arm of the antenna via the mixer 85 and provides a signal on line 126 that is representative of the logarithm of the amplitude of the IF signal on line 98. The log IF amplifier 124 is coupled to the fourth arm of the antenna via the mixer 87 and provides a signal on line 127 that is representative of the logarithm of the amplitude of the IF signal on line 102. The summing device 125 adds the signal on line 127 to the negative of the signal on line 126 to effect a log amplitude comparison of the signals on lines 127 and 126 and thereby provides an $\epsilon_B$ signal on line 128 in accordance with expression (11) above.

The processing circuit 39 includes four multipliers 60, 61, 62 and 63 and two summing devices 64 and 65 for processing the $\epsilon_A$ and $\epsilon_B$ signals on lines 121 and 128 respectively. The processing circuit 39 also receives $\phi_A$ angle function signals on lines 105, 106, 107 and 108 from a microprocessor 109. The microprocessor 109 provides a signal representative of $\cos \phi_A$ on line 105, a signal representative of $\sin \phi_A$ on line 106 a signal representative of $-\sin \phi_A$ on line 107, and a signal representative on $\cos \phi_A$ on line 108. The microprocessor generates the signals on lines 105, 106, 107 and 108 in accordance with the frequency of the radiation received from the RF source being tracked by the monopulse receiver. Determination of the frequency of such received radiation for use by the microprocessor is accomplished with a control circuit (not shown), which is known to those skilled in the art, and which does not form a part of the present invention. A signal indicating the frequency of the received radiation is provided by the control circuit to the microprocessor 109 via line 111.

The microprocessor also provides a signal on line 110 for controlling the frequency of the local oscillator 83.

The multiplier 60 multiplies the $\epsilon_A$ on line 121 by the $\cos \phi_A$ signal on line 105 to provide a signal on line 74 that is representative of $\epsilon_A \cos \phi_A$.

The multiplier 61 multiplies the $\epsilon_B$ signal on line 128 by the $-\sin \phi_A$ signal on line 107 to provide a signal on line 76 that is representative of $-\epsilon_B \sin \phi_A$.

The summing device 64 adds the signal on line 75 to the signal on line 76 to provide an $\epsilon_y$ signal on line 77 that is proportional to $\sin \phi_T$.

The multiplier 62 multiplies the $\epsilon_A$ signal on line 121 by the $\sin \phi_A$ signal on line 106 to provide a signal on line 78 that is representative of $\epsilon_A \sin \phi_A$.

The multipier 63 multiplies the $\epsilon_B$ signal on line 128 by the $\cos \phi_A$ signal on line 108 to provide a signal on line 79 that is representative of $\epsilon_B \cos \phi_A$.

The summing device 65 adds the signal on line 78 to the signal on line 79 to provide an $\epsilon_x$ signal on line 80 that is proportional to $\cos \phi_T$.

Figure 6:
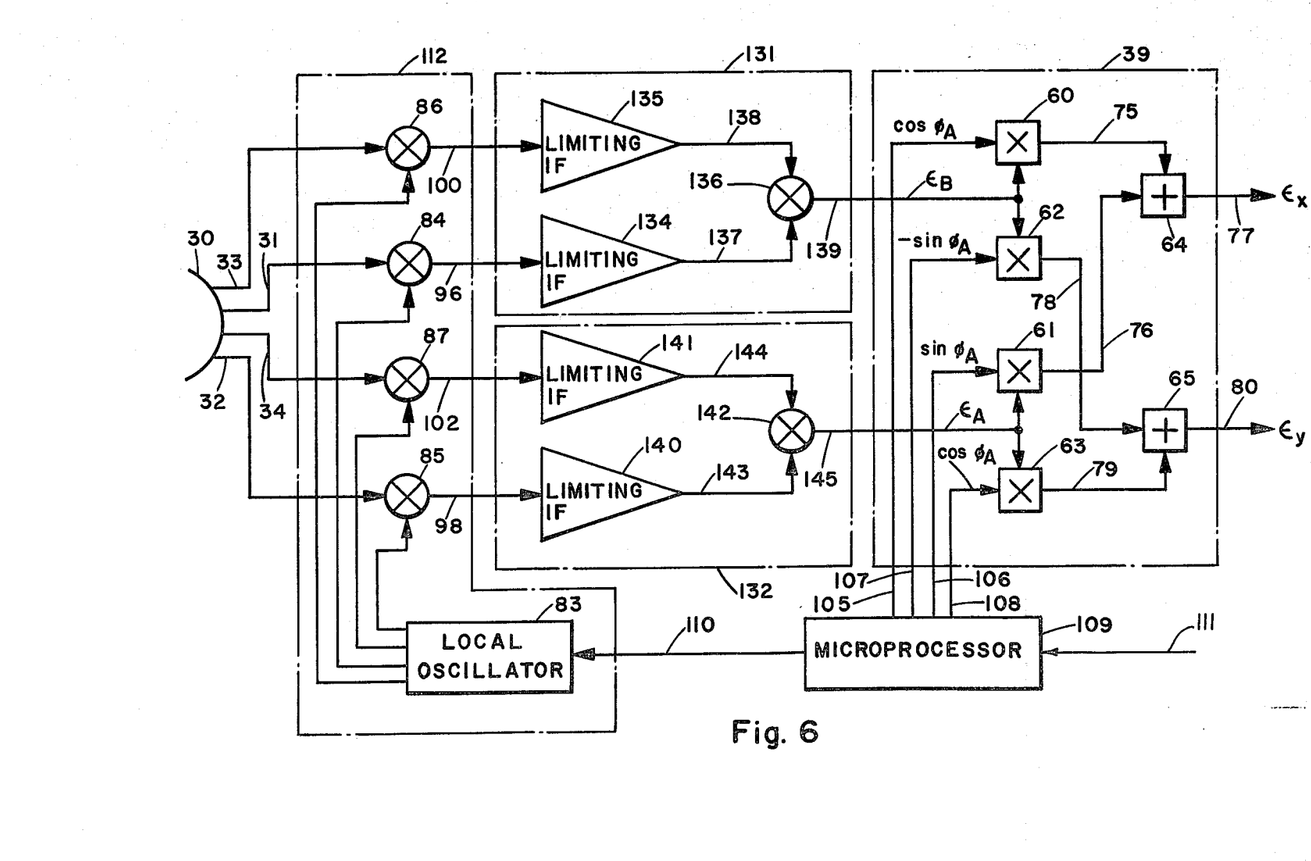
FIG. 6 is a schematic diagram of a preferred embodiment of the present invention employing a phase comparison of the detected signals.

A monopulse superheterodyne phase processing receiver according to the present invention is shown in FIG. 6. Certain of the components of this receiver are the same as some of the components of the receiver of FIGS. 3, 4 and 5 and they are referred to by common reference numerals.

The receiver of FIG. 6 is coupled to a four-arm spiral antenna 30. The antenna has a first lead 31 from antenna arm A1 (as shown in FIG. 2), a second lead 32 from arm A2, a third lead 33 from arm A3 and a fourth lead 34 from arm A4.

The receiver includes a detection circuit 112, a first comparison circuit 131, a second comparison circuit 132 and a processing circuit 39.

The detection circuit 112 includes a local oscillator 83 and four mixers 84, 85, 86 and 87. The local oscillator 83 provides a high frequency signal to the mixers.

The mixer 84 mixes the signal received on lead 31 from the first arm of the antenna 30 with the high frequency signal from the local oscillator network 83 to provide a first intermediate frequency (IF) signal on line 96.

The mixer 85 mixes the signal received on lead 32 from the second arm of the antenna 30 with the high frequency signal from the local oscillator 83 to provide a second IF signal on line 98.

The mixture 86 mixes the signal received on lead 33 from the third arm of the antenna 30 with the high frequency signal from the local oscillator 83 to provide a third IF signal on line 100.

The mixer 87 mixes the signal received on lead 34 from the fourth arm of the antenna 30 with the high frequency signal from the local oscillator 83 to provide a fourth IF signal on line 102.

The first comparison circuit 131 includes limiting IF amplifiers 134 and 135 and a mixer 136. The limiting IF amplifier 134 is coupled to the first arm of the antenna via the mixer 84 and provides a square wave signal on line 137 that sharply defines the phase of the IF signal on line 96. The limiting IF amplifier 135 is coupled to the third arm of the antenna via the mixer 86 and provides a square wave signal on line 138 that sharply defines the phase of the IF signal on line 100. The mixer 136 mixes the signal on line 137 with the signal on line 138 to effect a phase comparison of the signals on lines 137 and 138 and thereby provides an $\epsilon_B$ signal on line 139 in accordance with expression (12) above.

The second comparison circuit 132 includes limiting IF amplifiers 140 and 141 and a mixer 142. The limiting IF amplifier 140 is coupled to the second arm of the antenna via the mixer 85 and provides a square wave signal on line 143 that sharply defines the phase of the IF signal on line 98. The limiting IF amplifier 141 is coupled to the fourth arm of the antenna via the mixer 87 and provides a square wave signal on line 144 that sharply defines the phase of the amplitude of the IF signal on line 102. The mixer 142 mixes the signal on line 143 with the signal on line 144 to effect a phase comparison of the signals on lines 143 and 144 and thereby provides an $\epsilon_A$ signal on line 145 in accordance with expression (13) above.

The processing circuit 39 includes four multipliers 60, 61, 62 and 63 and two summing devices 64 and 65 for processing the $\epsilon_A$ and $\epsilon_B$ signals on lines 145 and 139 respectively. The processing circuit 39 also receives $\phi_A$ angle function signals on lines 105, 106, 107 and 108 from a microprocessor 109. The microprocessor 109 provides a signal representative of cos $\phi_A$ on line 105, a signal representative of sin $\phi_A$ on line 106, a signal representative of $-\sin \phi_A$ on line 107, and a signal representative on cos $\phi_A$ on line 108. The microprocessor generates the signals on lines 105, 106, 107 and 108 in accordance with the frequency of the radiation received from the RF source being tracked by the monopulse receiver. Determination of the frequency of such received radiation for use by the microprocessor is accomplished with a control circuit (not shown), which is known to those skilled in the art, and which does not form a part of the present invention. A signal indicating the frequency of the received radiation is provided by the control circuit to the microprocessor 109 via line 111.

The microprocessor aso provides a signal on line 110 for controlling the frequency of the local oscillator 83.

The multiplier 60 multiplies the $\epsilon_B$ signal on line 139 by the cos $\phi_A$ signal on line 105 to provide a signal on line 75 that is representative of $\epsilon_B \cos \phi_A$.

The multiplier 61 multiplies the $\epsilon_A$ signal on line 145 by the sin $\phi_A$ signal on line 106 to provide a signal on line 76 that is representative of $\epsilon_A \sin \phi_A$.

The summing device 64 adds the signal on line 75 to the signal on line 76 to provide an $\epsilon_x$ signal on line 77 that is proportional to cos $\phi_T$.

The multiplier 62 multiplies the $\epsilon_B$ signal on line 139 by the $-\sin \phi_A$ signal on line 107 to provide a signal on line 78 that is representative of $-\epsilon_B \sin \phi_A$.

The multiplier 63 multiplies the $\epsilon_A$ signal on line 145 by the cos $\phi_A$ signal on line 108 to provide a signal on line 79 that is representative of $\epsilon_A \cos \phi_A$.

The summing device 65 adds the signal on line 78 to the signal on line 79 to provide on $\epsilon_y$ signal on line 80 that is proportional to sin $\phi_T$.

In the crystal and superheterodyne log IF and log video receiver of FIGS. 3, 4 and 5, if high signal levels are to be encountered, it is necessary to employ attenuators on the output leads 31, 32, 33 and 34 of the antenna 30 to avoid signal compression which would result in large measurement errors. With the superheterodyne phase processing receiver of FIG. 6, attenuators would not necessarily be required as mixers phase track approximately 20 dB past the point where mixer compression occurs.

Tests have been performed to compare the performance of the receiver of the present invention to the performance of a prior art receiver system having an RF mode matrix when each is used with a four-arm spiral antenna.

Figure 7:
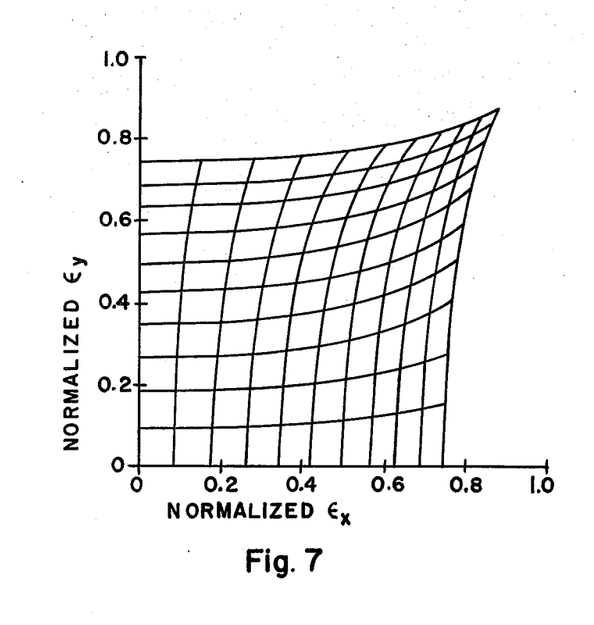
FIG. 7 is a computed phase and gain plot obtained with the receiver of the present invention when only modes 1 and 2 are accounted for in the computations.

FIG. 7 is a computer phase and gain plot obtained for the receiver of FIG. 6 when modes 1 and 2 are accounted for in the computations. The plot of FIG. 7 shows the relationship between $\epsilon_x$ and $\epsilon_y$. To generate this plot for each selected fixed location of the radiation source in relation to the x axis, the location of the radiation source in relation to the y axis was varied while $\epsilon_x$ versus $\epsilon_y$ was computed and plotted; and for each selected fixed location of the radiation source in relation to the y axis, the location of the radiation source in relation to the x axis was varied while $\epsilon_x$ versus $\epsilon_y$ was computed and plotted. The gain is indicated by the separation between the lines. The phase is inferred from the slope of the lines. For a perfect direction finding receiver system the plotted lines would be straight and equally spaced. The receiver performance shown in the computer plot of FIG. 7 is indicative of the performance of the prior art receiving system having an RF mode matrix.

Figure 8:
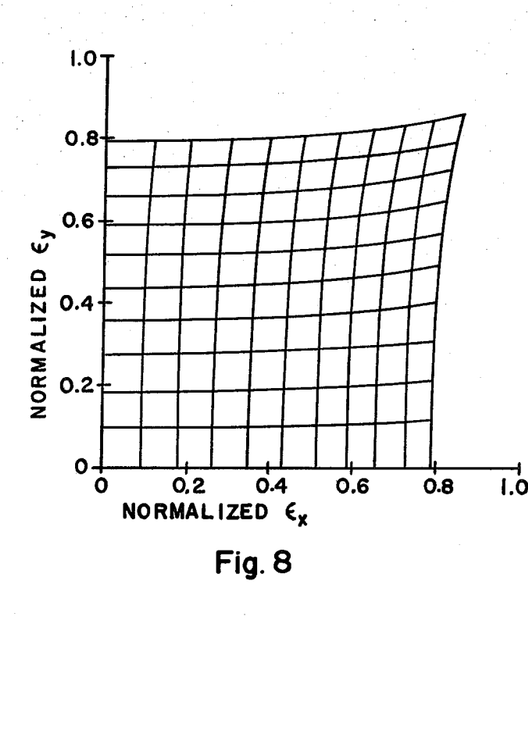
FIG. 8 is a computed phase and gain plot obtained with the receiver of the present invention when modes 1 through 8 are accounted for in the computations.

FIG. 8 is a computed phase and gain plot obtained for the receiver of FIG. 6 when modes 1 through 8 are accounted for in the computations. This plot was obtained in the same manner as the plot of FIG. 7. Comparing the plot of FIG. 8 with the plot of FIG. 7, it is noted that the plotted lines are straighter when more modes are accounted for. Since more than modes 1 and 2 actually are present when the receiver is operated, it can be concluded that the performance of the receiver of the present invention is better than the performance of the prior art receiver system with an RF mode matrix; which latter performance is about the same as that shown in FIG. 7, as noted above.

Figure 9A:
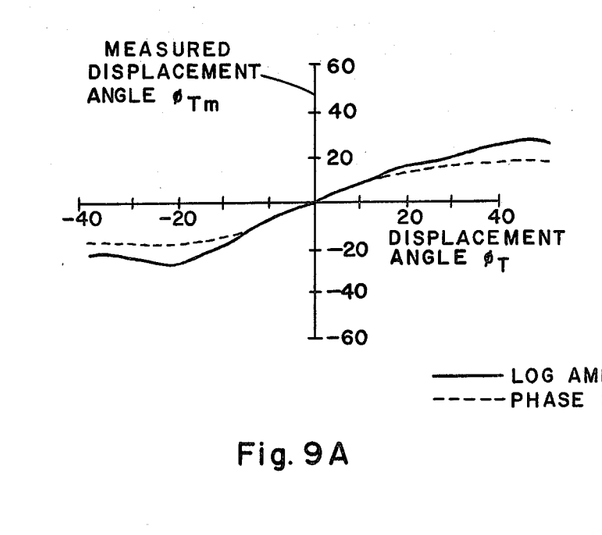
FIG. 9(a) shows the relationship between the measured displacement angle $\phi_{Tm}$ and the actual displacement angle $\phi_T$ of the radiation source when using the receiver of the present invention without an RF mode matrix.
Figure 9B:
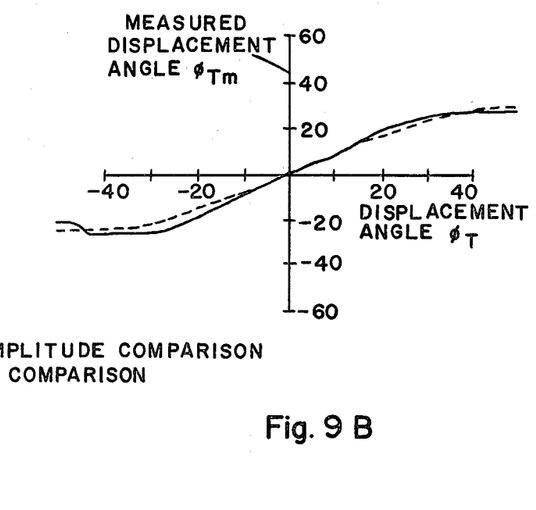
FIG. 9(b) shows the relationship between the measured $\theta_{Tm}$ displacement angle and the actual displacement angle $\theta_T$ of the radiation source when using a prior art receiver system with an RF mode matrix

Referring to FIG. 9(a), using measured antenna data, a measured displacement angle $\phi_{Tm}$ was computed and plotted in relation to the actual displacement angle $\phi_T$ for a computer simulated receiver according to the present invention used with a four-arm spiral antenna when making a log amplitude comparison and when making a phase comparison. The solid line shows the relationship between $\phi_{Tm}$ and $\phi_T$ for the log amplitude comparison; and the dashed line shows the relationship between $\phi_{Tm}$ and $\phi_T$ for the phase comparison. FIG. 9(b) is a plot of measured displacement angle $\phi_{Tm}$ versus actual displacement angle $\phi_T$ that was computed using measured antenna data for a computer simulated prior art receiver system having an RF mode matrix used with a four-arm spiral antenna when making a log amplitude comparison and when making a phase comparison.

The plotted data of FIGS. 7, 8, 9(a) and 9(b) were computed based upon the assumption that there are no non-linearities in the operating regions of the components of the simulated receivers.

Comparing FIGS. 9(a) and 9(b), it is seen that the quality of performance of the receiver of the present invention is about the same as the performance of the more costly and more complex prior art receiver system having an RF mode matrix.

We claim:

1. A receiver for locating a source of RF radiation received by a four-arm spiral antenna having an angular measurement frame normal to the antenna axis, comprising detection means for detecting signals received from each of the spiral arms in response to receipt of RF radiation by the antenna;

first comparison means for comparing signals detected from a first opposite pair of said spiral arms to produce a first signal that is proportional to a first function of the frequency of the received RF radiation and the angular displacement of the radiation source in the measurement frame;

second comparison means for comparing signals detected from the remaining opposite pair of said spiral arms to produce a second signal that is proportional to a second function of the frequency of the received RF radiation and the angular displacement of the radiation source in the measurement frame; and processing means for processing the first and second signals to produce third and fourth signals that are proportional to said angular displacement and independent of the frequency of the received RF radiation;

wherein the first comparison means comprises means for comparing the logarithms of the amplitudes of said signals detected from the first opposite pair of spiral arms to produce a said first signal that is proportional to sin ($\phi_T + \phi_A$), wherein $\phi_T$ is the angle of said displacement of the radiation source and $\phi_A$ is an angle that is a function of the frequency of the received RF radiation;

wherein the second comparison means comprises means for comparing the logarithms of the amplitudes of said signals detected from the remaining opposite pair of spiral arms to produce a said second signal that is proportional to cos ($\phi_T + \phi_A$); and wherein the processing means comprises a first multiplier for multiplying the first signal by cos $\phi_A$ to produce a fifth signal;

a second multiplier for multiplying the first signal by sin $\phi_A$ to produce a sixth signal;

a third multiplier for multiplying the second signal by $-\sin \phi_A$ to produce a seventh signal;

a fourth multiplier for multiplying the second signal by cos $\phi_A$ to produce an eighth signal;

a first summing means for adding the fifth and seventh signals to produce the third signal, wherein the third signal is proportional to sin $\phi_T$; and a second summing means for adding the sixth and eighth signals to produce the fourth signal, wherein the fourth signal is proportional to cos $\phi_T$.

2. A receiver for locating a source of RF radiation received by a four-arm spiral antenna having an angular measurement frame normal to the antenna axis, comprising detection means for detecting signals received from each of the spiral arms in response to receipt of RF radiation by the antenna;

first comparison means for comparing signals detected from a first opposite pair of said spiral arms to produce a first signal that is proportional to a first function of the frequency of the received RF radiation and the angular displacement of the radiation source in the measurement frame;

second comparison means for comparing signals detected from the remaining opposite pair of said spiral arms to produce a second signal that is proportional to a second function of the frequency of the received RF radiation and the angular displacement of the radiation source in the measurement frame; and processing means for processing the first and second signals to produce third and fourth signals that are proportional to said angular displacement and independent of the frequency of the received RF radiation;

wherein the first comparison means comprises means for comparing the phases of said signals detected from the first opposite pair of spiral arms to produce a said first signal that is proportional to cos ($\phi_T + \phi_A$), wherein $\phi_T$ is the angle of said displacement of the radiation source and $\phi_A$ is an angle that is a function of the frequency of the received RF radiation;

wherein the second comparison means comprises means for comparing the phases of said signals detected from the remaining opposite pair of spiral arms signals to produce a said second signal that is proportional to sin ($\phi_T + \phi_A$); and wherein the processing means comprises a first multiplier for multiplying the first signal by cos $\phi_A$ to produce a fifth signal;

a second multiplier for multiplying the first signal by $-\sin \phi_A$ to produce a sixth signal;

a third multiplier for multiplying the second signal by sin $\phi_A$ to produce a seventh signal;

a fourth multiplier for multiplying the second signal by cos $\phi_A$ to produce an eighth signal;

a first summing means for adding the fifth and seventh signals to produce the third signal, wherein the third signal is proportional to cos $\phi_T$; and a second summing means for adding the sixth and eighth signals to produce the fourth signal, wherein the fourth signal is proportional to sin $\phi_T$.

3. A method for locating a source of RF radiation received by a four-arm spiral antenna having an angular measurement frame normal to the antenna axis, comprising the steps of:

(a) detecting signals received from each of the spiral arms in response to receipt of RF radiation by the antenna;

(b) comparing signals detected from a first opposite pair of said spiral arms to produce a first signal that is proportional to a function of the frequency of the received RF radiation and the angular displacement of the radiation source in the measurement frame;

(c) comparing signals detected from the remaining opposite pair of said spiral arms to produce a second signal that is proportional to a second function of the frequency of the received RF radiation and the angular displacement of the radiation source in the measurement frame; and (d) processing the first and second signals to produce third and fourth signals that are proportional to said angular displacement and independent of the frequency of the radiation source;

wherein step (b) comprises comparing the logarithms of the amplitudes of said signals detected from the first opposite pair of spiral arms to produce a said first signal that is proportional to sin ($\phi_T + \phi_A$), wherein $\phi_T$ is the angle of said displacement of the radiation source and $\phi_A$ is an angle that is a function of the frequency of the received RF radiation;

wherein step (c) comprises comparing the logarithms of the amplitudes of said signals detected from the remaining opposite pair of spiral arms to produce a said second signal that is proportional to cos ($\phi_T + \phi_A$); and wherein step (d) comprises the steps of:

(e) multiplying the first signal by cos $\phi_A$ to produce a fifth signal;

(f) multiplying the first signal by sin $\phi_A$ to produce a sixth signal;

(g) multiplying the second signal by $-\sin \phi_A$ to produce a seventh signal;

(h) multiplying the second signal by cos $\phi_A$ to produce an eighth signal;

(i) adding the fifth and seventh signals to produce the third signal, wherein the third signal is proportional to sin $\phi_T$; and (j) adding the sixth and eighth signals to produce the fourth signal, wherein the fourth signal is proportional to cos $\phi_T$.

4. A method for locating a source of RF radiation received by a four-arm spiral antenna having an angular measurement frame normal to the antenna axis, comprising the steps of:

(a) detecting signals received from each of the spiral arms in response to receipt of RF radiation by the antenna;

(b) comparing signals detected from a first opposite pair of said spiral arms to produce a first signal that is proportional to a function of the frequency of the received RF radiation and the angular displacement of the radiation source in the measurement frame;

(c) comparing signals detected from the remaining opposite pair of said spiral arms to produce a second signal that is proportional to a second function of the frequency of the received RF radiation and the angular displacement of the radiation source in the measurement frame; and (d) processing the first and second signals to produce third and fourth signals that are proportional to said angular displacement and independent of the frequency of the radiation source;

wherein step (b) comprises comparing the phases of said signals detected from the first opposite pair of spiral arms to produce a said first signal that is proportional to cos ($\phi_T + \phi_A$), wherein $\phi_T$ is the angle of said displacement of the radiation source and $\phi_A$ is an angle that is a function of the frequency of the received RF radiation;

wherein step (8c) comprises comparing the phases of said signals detected from the remaining opposite pair of spiral arms to produce a said second signal that is proportional to sin ($\phi_T + \phi_A$); and wherein step (d) comprises the steps of (e) multiplying the first signal by cos $\phi_A$ to produce a fifth signal;

(f) multiplying the first signal by $-\sin \phi_A$ to produce a sixth signal;

(g) multiplying the second signal by sin $\phi_A$ to produce a seventh signal;

(h) multiplying the second signal by cos $\phi_A$ to produce an eighth signal;

(i) adding the fifth and seventh signals to produce the third signal, wherein the third signal is proportional to cos $\phi_T$; and (j) adding the sixth and eighth signals to produce the fourth signal, wherein the fourth signal is proportional to sin $\phi_T$.

* * * * *